C. W. HOWLAND.
MACHINE FOR CENTERING, MARKING, AND TESTING LENSES.
APPLICATION FILED DEC. 14, 1915.
1,225,334.
Patented May 8, 1917.
3 SHEETS—SHEET 1.
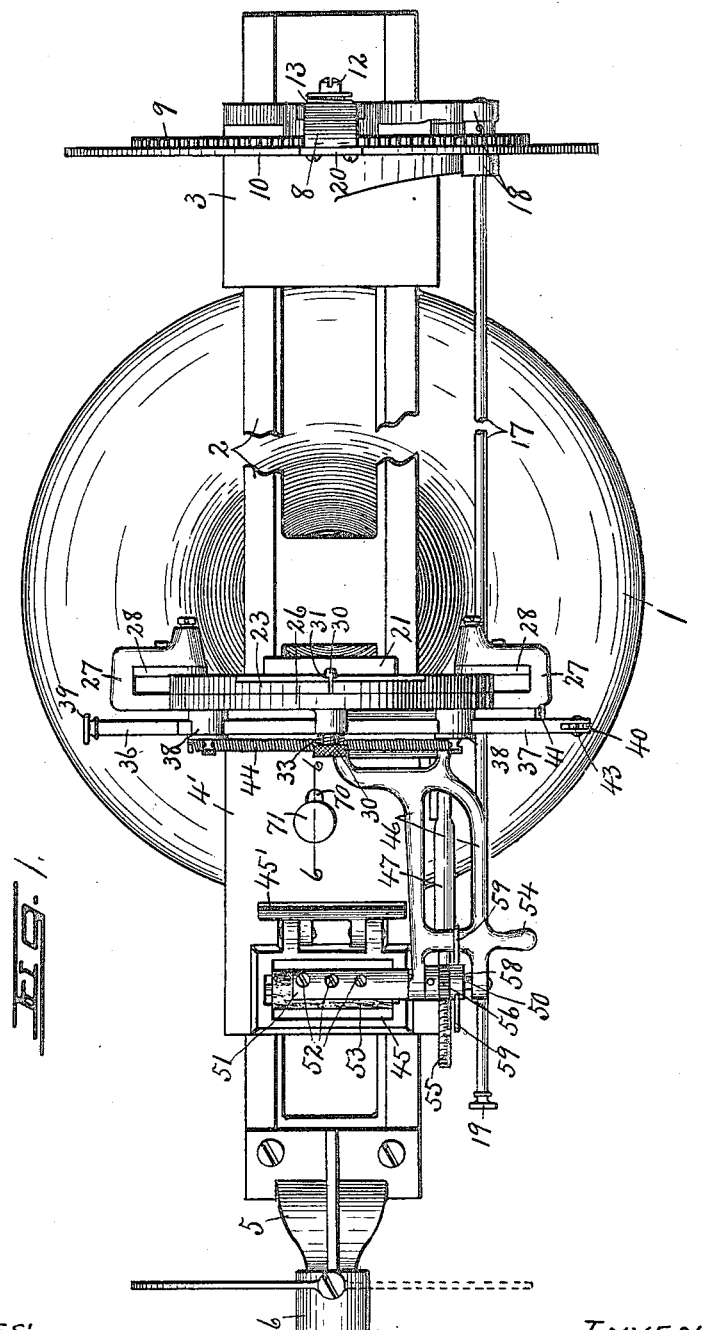

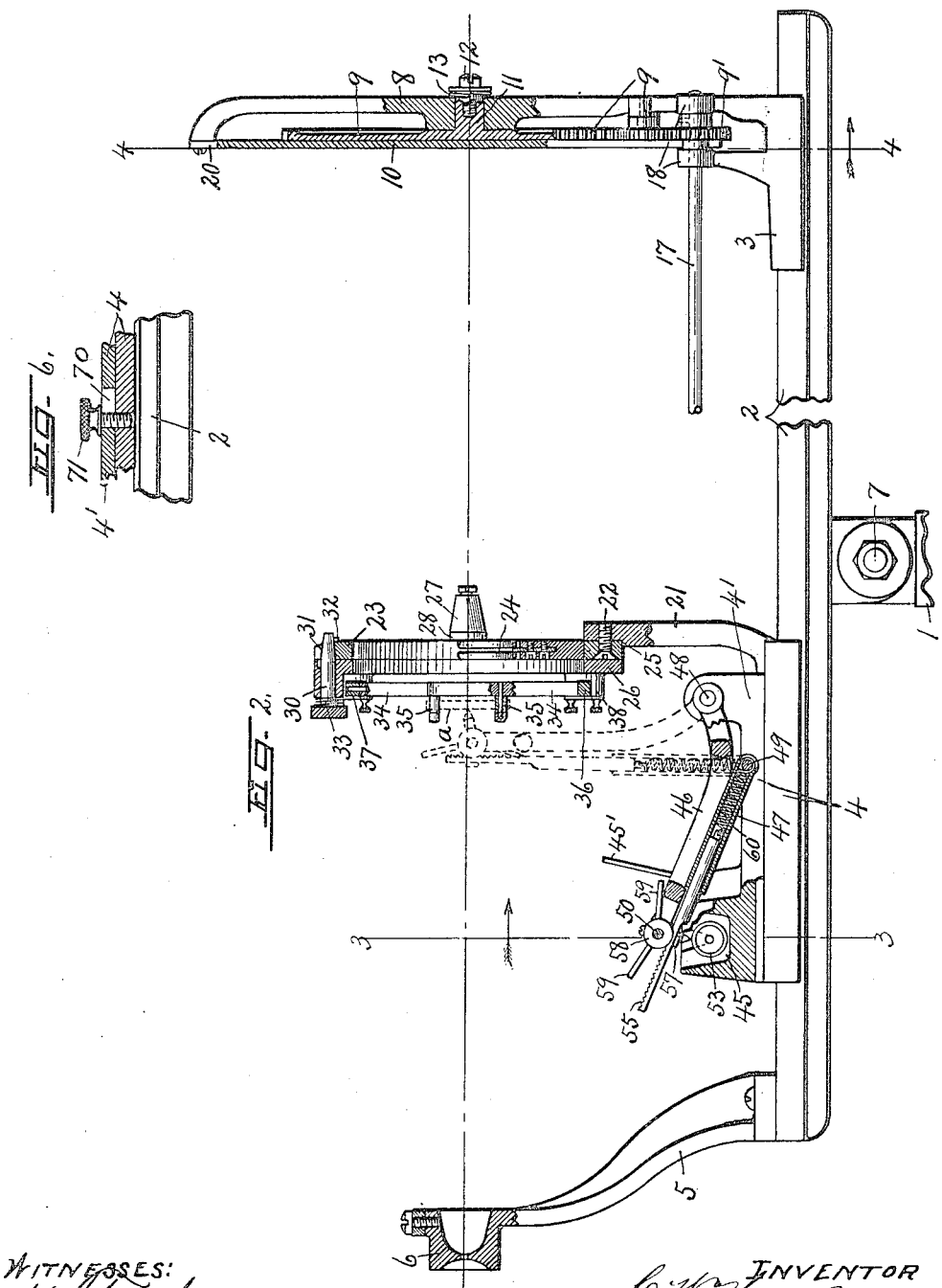

C. W. HOWLAND.
MACHINE FOR CENTERING, MARKING, AND TESTING LENSES.
APPLICATION FILED DEC. 14, 1915.
1,225,334.
Patented May 8, 1917.
3 SHEETS—SHEET 3.
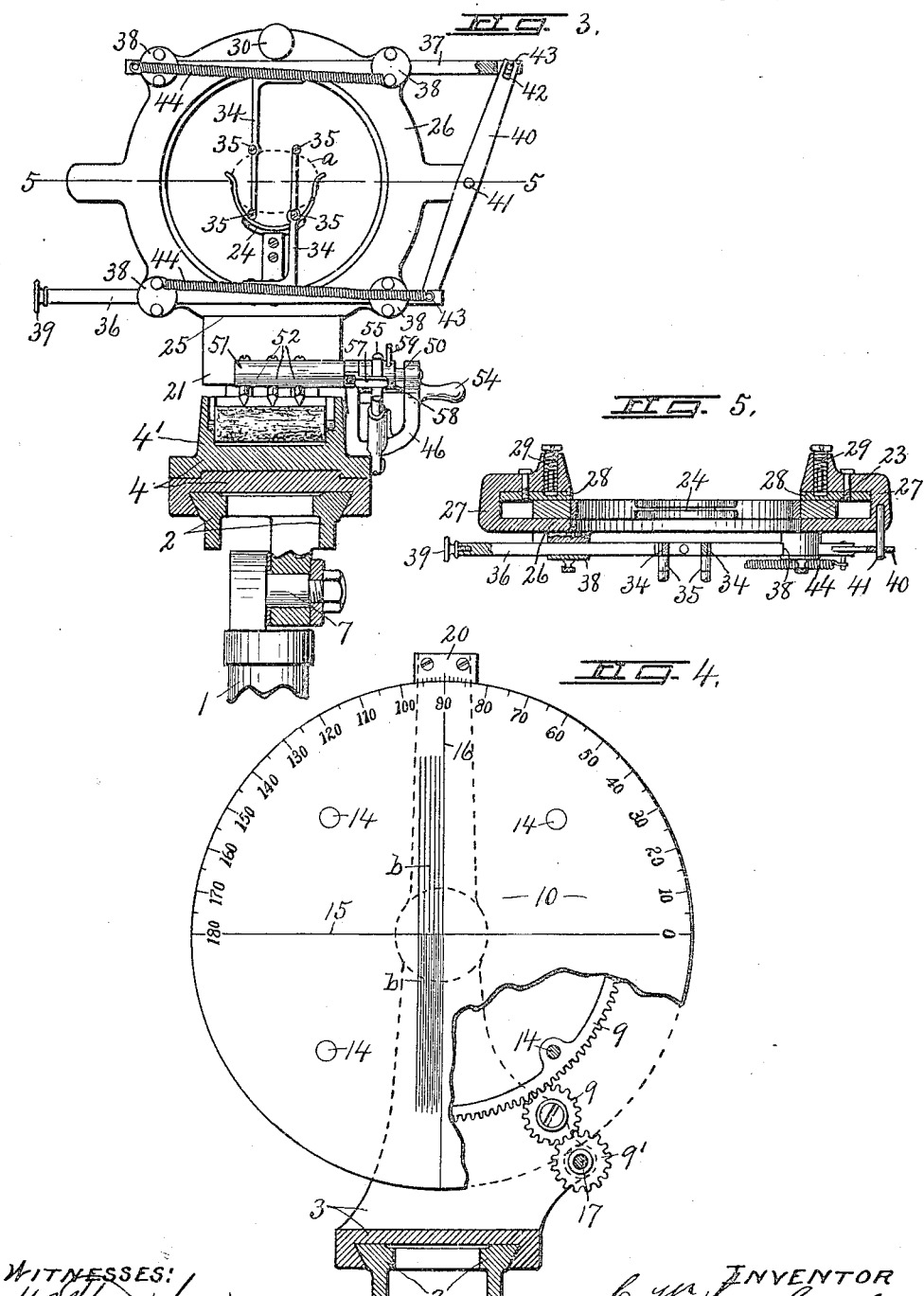

UNITED STATES PATENT OFFICE.

CHAUNCEY W. HOWLAND, OF GENEVA, NEW YORK, ASSIGNOR TO THE STANDARD OPTICAL COMPANY, OF GENEVA, NEW YORK, A CORPORATION OF NEW YORK.

MACHINE FOR CENTERING, MARKING, AND TESTING LENSES.

1,225,334.     Specification of Letters Patent.     Patented May 8, 1917.

Application filed December 14, 1915. Serial No. 66,736.

*To all whom it may concern:*

Be it known that I, CHAUNCEY W. HOWLAND, a citizen of the United States of America, and resident of Geneva, in the county of Ontario, in the State of New York, have invented new and useful Improvements in Machines for Centering, Marking, and Testing Lenses, of which the following, taken in connection with the accompanying drawings, is a full, clear, and exact description.

This invention relates to certain improvements in machines for centering, marking and testing lenses of the class set forth in my Patent No. 790,059, May 16, 1905, and in Patent No. 1,134,938, April 6, 1915, of which I am joint inventor, except that in the present device I have sought to obtain in a single instrument the salient advantages of those forming the subject-matter of the patents referred to, and at the same time increasing the general efficiency and accuracy of this class of instruments.

In other words, one of the objects is to combine in the same machine a rotary target of the class shown in the first-named patent with a rotary and radially adjustable lens holder of the class shown in the second-named patent so that either adjustment may be used with equal efficiency in centering, marking or testing a lens.

Another object is to employ a relatively larger target than has heretofore been practised in connection with a relatively small fixed segment graduated in degrees to coöperate with the graduations on the target for permitting the readings to be taken visually in exact degrees instead of in multiples of five degrees or comparative computations of fractions thereof.

A further object is to provide means operable at will for positively rotating the target to any degree.

A still further object is to provide the rotary lens holder with a more simplified form of lens-clamping means which is operable automatically to grip the lens, but manually to release the same.

Other objects and uses relating to specific parts of the machine will be brought out in the following description.

In the drawings—

Figure 1 is a top plan, partly broken away, of a lens centering, marking and testing machine embodying the various features of my invention.

Fig. 2 is a longitudinal vertical sectional view of the same machine, except that the supporting base and greater portion of the standard are broken away.

Figs. 3 and 4 are transverse vertical sectional views taken, respectively, on lines 3—3 and 4—4, Fig. 2.

Fig. 5 is a horizontal sectional view taken on line 5—5, Fig. 3.

Fig. 6 is a detail sectional view taken on line 6—6, Fig. 1.

As illustrated, this machine comprises a supporting base or standard —1— of suitable height carrying upon its upper end an elongated tilting guide frame or bed —2— for receiving a target-supporting carriage —3—, a separate carriage —4— for the lens holder and marking device, and a relatively stationary bracket —5— carrying a sight tube —6—, all arranged in sequence one in advance of the other lengthwise of and upon the supporting bed —2—.

The bed or table —2— is hingedly connected intermediate its ends to the upper end of the standard —1— by pivotal pin —7— to swing vertically about an axis at right angles to its longitudinal center to better accommodate the sight tube to the eye of the user, and is preferably dovetail in cross section for sliding interlocking engagement in similarly formed recesses in the lower faces of the carriages —3— and —4—, although it is evident that both carriages may be removed and replaced from and upon one end of the bed opposite that to which the bracket —5— is secured.

*Target mechanism.*

The carriage —3— may be adjusted lengthwise of and upon the bed —2— and is provided with an upright portion —8— extending a considerable distance above the produced axis of the sight tube —6— for receiving and supporting a gear —9— and a target —10—, said gear being provided with a hub —11— journaled in a suitable bearing in the upright —8— co-axial with the produced axis of the sight tube —6— and frictionally held in place by a cap screw —12— and spring washer —13— to allow it to be turned when desired, the spring washer —13— being interposed between the head of the screw —12— and adjacent face of the upright —8— to frictionally hold the gear and target in their adjusted positions.

The target —10— is secured by any suitable fastening means, as rivets —14—, to the front face of the gear —9—, and is preferably circular and co-axial with said gear and provided upon its front face with a semi-circular row of graduations progressively increasing in value by five degrees from zero to one hundred and eighty (180) around the upper half of the periphery so that the zero and one hundred and eighty degree graduations are disposed at opposite ends of the same diametrical line, as —15—.

Another diametrical cross line —16— is impressed upon the same face of the target at right angles to the first-named line —15— and, therefore, intersects said line at the axis of the target, which is also provided with additional sets of lines —b— and —b'—, respectively, above and below the line —15— and parallel with the cross line —16— for obtaining and testing the dioptrics or prismatic power of lenses.

The upper set of lines —b— indicate prism diopters and the lower set —b'— one-half diopters, when the target is set at a predetermined distance of say, twenty centimeters, from the lines and it, therefore, follows that if the target is set at one-half such distance or ten centimeters from the lens for short focus lenses, the lower set of lines —b'— will indicate prism diopters and the upper set two diopters.

Suitable means is provided for positively adjusting the target rotarily, said means consisting, in this instance, of the gears —9— and a driving pinion —9'— which is secured to a horizontal shaft —17— extending lengthwise of and at one side of the machine and having one end journaled in suitable bearings —18— on the carriage —3— and its other end extending forwardly within easy reaching distance of the operator when sighting through the tube —6—, and provided with a hand-piece —19— by which it may be turned for rotating the gear —9— and target secured thereto in either direction.

The upright —8— of the carriage —3— extends above the upper edge of the target and is provided with a relatively short segment or plate —20— extending circumferentially of and in close proximity to the periphery of the target and provided with degree graduations arranged in sequence from and at opposite sides of the line —16— when the target is in its normal or zero position with the ninety (90) degree mark registering with the medial graduation on the plate —20—.

These degree graduations on the plate —20— are clearly visible through the sight tube and enable the operator to secure greater accuracy of measurement of the angle of the optical axis with relation to the mechanical or spherical and cylindrical lenses, and at the same time locating the optical axis of the lens under test or preparatory to marking.

Lens-supporting mechanism.

The carriage —4— for the lens holder and marker also has a limited adjustment along and upon its supporting bed —2— and is provided near its rear end with an upstanding arm or bracket —21—, to which is secured by screws —22— a ring or circular plate —23— rising some distance above the arm —21—, said ring being provided with a central circular opening co-axial with the axis of the target —10— and sight tube —6— for receiving and supporting a test-lens frame —24—, the lower edge of the ring being flattened to rest against a corresponding seat —25— on the bracket —21— to additionally hold said ring in fixed relation to the carriage.

A separate ring —26— is movable across and upon the front face of its supporting ring —23— and is provided with diametrically opposite arms —27— returning across the back of the ring —23— and provided with bearing plates —28— which are spring-pressed against the rear face of the ring —23— by springs —29— to frictionally hold the ring —26— in its adjusted position.

Suitable means is provided, however, for locking the ring —26— in co-axial relation to the ring —23—, said means consisting, in this instance, of a locking bolt —30— slidable in a suitable aperture in the upper portion of the ring —26— and having its rear end tapered and engaged in a corresponding aperture —31— in the contiguous portion of the ring —23—, in which position it is held by a radially projecting stud —32— on the inner end of the bolt and engaging the rear face of the ring —23—, as shown in Fig. 2.

A coil spring —33— surrounding the bolt between its head and adjacent face of the ring —26— serves to withdraw said bolt from its locking position so as to clear the ring —23—. The upper portions of the apertures in which the locking bolt is movable are slotted to receive the stud —32— when registered therewith by the turning of the bolt, thereby allowing said bolt to be withdrawn from its locking position either by hand or by the tension of the spring —33—.

The lens-clamping device or chuck comprises a pair of jaws or arms —34— located at opposite sides of the axis of the rings —23— and —26— in a plane directly in front of and parallel with the front face of the ring —26—, and are movable transversely of the machine toward and from said axis, each jaw or arm being provided with a pair of forwardly projecting pins —35— spaced equi-distant apart above and below the horizontal plane of said axis in such manner as to engage the perimeter of a lens, as —a—, for supporting the same in a plane at substantially right angles to said axis.

These jaws —34— are secured to separate operating bars —36— and —37— located, respectively, below and above the openings in the rings in parallelism for transverse horizontal movement, each bar being guided in spaced ways —38— on the adjustable ring —26— located at opposite sides of the vertical plane of the axis of said rings, the lower bar —36— being provided at one end with a hand-piece —39— within easy reaching distance of the operator when sighting through the tube —6—.

The opposite ends of these bars are connected by a lever —40— fulcrumed intermediate its ends at —41— to the adjacent side of the ring —26— and having its opposite ends slotted at —42— for engaging pins —43— on the bars —36— and —37—, whereby, when the bar —36— is operated in one direction to move the jaw —34— in the same direction, the bar —37— and its corresponding jaw —34— will be moved in the opposite direction for opening and closing the jaws as the operating bar is moved in reverse directions, said bars being operated in one direction to close the jaws upon the perimeter of the lens by means of retracting springs —44—, as shown more clearly in Fig. 3.

*Marking device.*

The marking device is normally supported in a plane wholly below the lens holder and upon the carriage —4— and is very similar to that set forth in the joint patent to Bader and myself No. 1,134,938, previously referred to, in that it comprises an ink reservoir —45— and rock arms —46— and —47—, all mounted upon the carriage —4—, the rock arms —46— and —47— being pivoted at one end at —48— and —49—, respectively, to said carriage to rock vertically lengthwise of the machine, the arm —46— being provided at its opposite end with a rock shaft —50— parallel with the axis of the pivot —48— and spaced apart therefrom a distance coresponding approximately to the distance between said pivot and axis of the sight tube —6— and target.

Secured to the shaft —50— is a relatively small drum —51— carrying a series of, in this instance, three radial marking pins —52—, the points of which are adapted to alternately engage an ink pad or roller —53— in the reservoir —45—, and the surface of the lens as —a— in the holder as the arm —46— is operated by means of its hand-piece —54—.

The arm —47— is preferably tubular and receives one end of a toothed rack —55— which is slidable therein, said rack being held in mesh with a pinion —56— on the rock shaft —50— by means of a bearing —57— on the adjacent end of the rock arm —46—, so that when the last-named arm is rocked upwardly from its normal position in which the pins —52— contact with the ink pad, the rack —55—, moving through an arc of shorter radius than that of the arm —46— and coöperating with the pinion —56—, will rotate the drum —51— and cause the points of the pins to engage the surface of the lens at points in a plane coincident with the axis of the sight tube and target, the middle pin being positioned so as to engage the lens at a point in said axis, thereby marking the center as well as the mechanical axis of the lens.

In order that the points of the pins may properly contact with the ink pad and lens, it is necessary to positively limit the arc of movement of the pin-carrying drum or rock shaft —50—, and for this purpose I have provided the rock shaft with a collar —58— having opposite radial limiting stops —59— adapted to engage opposite faces of the adjacent portion of the arm —46—.

It is evident, however, that the rack —55— may continue to move endwise in its tubular supporting arm —47— after the drum —51— has reached the limit of its movement as determined by the stops —59—, and in order to allow such movement, the inner end of the rack —55— is connected by a spring —60— to the pivot —49— which is placed under tension when the pins are moved to their marking positions, and is placed under compression when the pins are engaged with the ink pad, the stops —59— being adjusted so as to permit the pin-supporting drum to move through an arc of half a turn from one extreme position to the other.

When the device is not in use, the ink reservoir may be covered by a suitable lid —45'— to exclude dust and other foreign matter.

The adjustments of both the lens holder and target permit this machine to be used for accurately centering, marking or testing any form of lens, whether plano, prismatic, cylindrical or spherical without any liability of error so long as the lens is properly placed in the holder with the eye side toward the sight tube.

For example in centering and marking a lens, it is placed in the holder, and if necessary the holder with the lens therein adjusted rotarily or transversely until it is visually centered through the sight tube with the cross lines of the target, whereupon the marker may be operated to impress three points in the same straight line, representing the optical center and axis, and permitting the lens thus marked to be properly alined in a cutting machine for cutting.

When the lens to be marked is a planocylinder or sphero-cylinder, the target may be adjusted rotarily to the degree corresponding to that of the prescribed optical axis and the lens holder with the lens therein adjusted to visually center it with the cross lines of the target, whereupon the marker may be operated to impress the mechanical axis marks thereon preparatory to being cut in a cutting machine.

In a similar manner, a spherical lens may be centered and marked by simply adjusting the holder with the lens therein until it is visually centered and alined with the cross lines of the target, after which the marker may be operated to impress the optical center and mechanical axis thereon preparatory to cutting.

In marking sphero-cylindrical prisms and sphero prisms, a neutralizing lens, representing the prismatic power of a lens to be marked, or the amount the lens is to be decentered with the base reversed, may be placed in the holder —24—, after which the lens in the holder may be centered and marked in the usual manner, it being understood that the prism lens in the frame —24— serves to neutralize the prism in the lens to be centered and marked.

In de-centering spherical lenses, such for example as a convex lens, the holder with the lens therein may be moved until the portion of the cross line of the target appearing in the lens is offset the desired number of prism diopters, whereupon the marker may be operated as described to mark the line of the mechanical axis thereon with the assurance that the mechanical center will be at the proper distance from the optical center.

The carriage —4— is provided with a relatively movable top section —4'— carrying the marking device and adjustable axially of the target a limited distance corresponding approximately to the length of the pins —35— so that when a lens is held between the gripping fingers —35—, the carriage section —4'— may be adjusted to cause the marking pins to impress their marks upon the front face of the lens in a horizontal plane exactly coincident with the axis of the target, while on the other hand if the user desires to hold a lens by hand against the pins —35— preparatory to marking or testing, it will be necessary to adjust the section —4'— toward the front a distance corresponding to the change of position of the lens in order that the marking points may be impressed upon the front face of the lens in the same horizontal plane, the section —4'— being slotted at —70— to permit such adjustment and may be held in its adjusted position by clamping screw or bolt —71— entering said slot and engaged in a threaded aperture in the lower section of the carriage —4—, as shown more clearly in Fig. 6.

Having now given several examples of the manner of marking lenses of different character requiring the separate adjustment of the lens holder and target, or the adjustment of both the lens holder and target, it is evident that the same mechanism may be used for testing lenses which have been cut for ascertaining the prismatic power or the relative positions of the mechanical centers and axes with reference to the optical centers and axes.

What I claim is:

1. In a machine of the character described, the combination of a bed having lengthwise guides, a sight tube mounted on one end of the bed, a carriage movable along and upon the guides on the opposite end of the bed, a cross-line target rotatably mounted on said carriage coaxial with the sight tube and having its side facing the tube provided with a circular row of numbered graduations, each representing a predetermined number of degrees of a circle, a relatively short fixed degree scale adjacent the upper edge of the target in the vertical plane of its axis and extending circumferentially a distance approximately equal to the distance between two adjacent numbered graduations of the target, a separate carriage mounted on the guide-ways of the bed between the target and sight tube, a ring mounted on the second-named carriage coaxial with the axis of the target and sight tube, a lens-holder mounted on the ring, and a marking device mounted upon the second-named carriage between the ring and sight-tube.

2. In a machine of the character described, the combination of a bed having lengthwise guides, a sight tube mounted on one end of the bed, a carriage movable along and upon the guides on the opposite end of the bed, a cross-line target rotatably mounted on said carriage coaxial with the sight tube and having its side facing the tube provided with a circular row of numbered graduations, each representing a predetermined number of degrees of a circle, a relatively short fixed degree scale adjacent the upper edge of the target in the vertical plane of its axis and extending circumferentially a distance approximately equal to the distance between two adjacent numbered graduations of the target, a separate carriage mounted on the guide-ways of the bed, a ring mounted on the second-named carriage coaxial with the axis of the target and sight tube, a lens-holder rotatably mounted on the ring, and a lens-marking device mounted on the second-named carriage between the ring and sight tube.

3. In a machine for centering, marking and testing lenses, the combination of a lens rest having separate bearing points for a lens in spaced relation axially, a marking device, and a supporting carriage therefor having a relatively movable section upon which the marking device is directly mounted for adjustment thereof to different positions corresponding to the spaced relation of the separate lens bearing.

4. In a machine for centering, marking and testing lenses, the combination of a lens rest having separate bearing points for a lens in spaced relation axially, a marking device and a supporting carriage therefor having a relatively movable section upon which the marking device is directly mounted for adjustment thereof to different positions corresponding to the spaced relation of the separate lens bearings, and means for locking the relatively movable section in its adjusted position relatively to the main supporting body of the carriage.

5. In a machine for centering, marking and testing lenses, the combination of a target, lens-rests at different distances from the target, and a lens-marker movable about an axis to impress a mark upon the lens, said axis being shiftable lengthwise of the target-axis relatively to the lens-rests to cause the marker to strike the lens at the same place when the lens is engaged with either rest with its optical axis in the same relation to the axis of the target.

6. In a machine for centering, marking and testing lenses, the combination of a cross-line target and a sight tube coaxial therewith, a lens-holder between the target and sight tube and adjustable lengthwise of said axis, a device for marking the lens located between the lens-holder and sight tube and having an independent adjustment lengthwise of the same axis relatively to the lens-holder, and means for operating the marker toward and from the lens-holder independently of its axial adjustment.

7. In a machine for centering, marking and testing lenses, the combination of a main supporting bed having lengthwise guides, a sight tube on one end of the bed, a carriage slidable along and upon the opposite end of the bed, a cross-line target rotatably mounted on the carriage coaxial with the sight tube and having its side facing the tube graduated circumferentially and the graduations numbered in sequence, a relatively short segment also mounted on the carriage in the vertical plane of the axis of the target directly over the upper edge thereof and having its side facing the tube graduated in fractional denominations of those of the target, a separate carriage movable along and upon the bed between the tube and target-supporting carriage, a lens-holder mounted on the second-named carriage and also adjustable rotarily about the axis of the target, a lens-marker movable toward and from the lens-holder, and a support for the lens-marker movable along and upon the second-named carriage.

In witness whereof I have hereunto set my hand this 7th day of December, 1915.

CHAUNCEY W. HOWLAND.

Witnesses:
WALTER HOWARD,
HOWARD P. DENISON.

Copies of this patent may be obtained for five cents each, by addressing the "Commissioner of Patents, Washington, D. C."